UNITED STATES PATENT OFFICE.

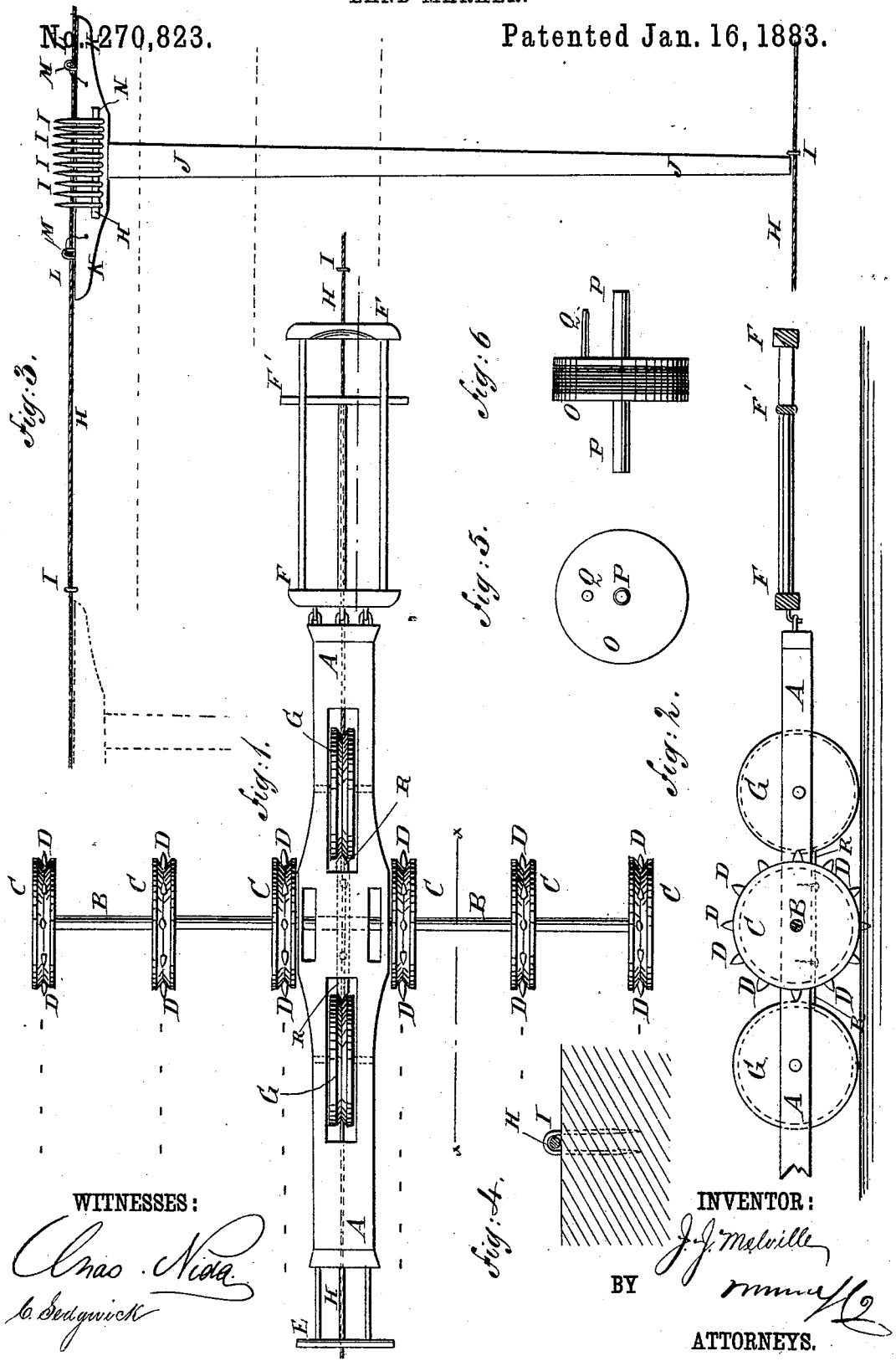

JAMES J. MELVILLE, OF NEW YORK, N. Y.

LAND-MARKER.

SPECIFICATION forming part of Letters Patent No. 270,823, dated January 16, 1883.

Application filed September 29, 1882. (No model.)

*To all whom it may concern:*

Be it known that I, JAMES J. MELVILLE, of the city, county, and State of New York, have invented a new and useful Improvement in Land-Markers, of which the following is a full, clear, and exact description.

Reference is to be had to the accompanying drawings, forming a part of this specification, in which similar letters of reference indicate corresponding parts in all the figures.

Figure 1 is a plan view of my improvement. Fig. 2 is a sectional side elevation of the same, taken through the line $x\,x$, Fig. 1. Fig. 3 is a plan view of the device for laying the guide-cord. Fig. 4 is a section of the guide-cord, illustrating the manner in which it is secured to the ground. Fig. 5 is a side elevation of the cord-spool, and Fig. 6 is a front view of the same.

The object of this invention is to promote convenience and secure accuracy in marking land, in planting seeds, and transplanting plants.

A cord is stretched across the field and kept in place by staples forced into the ground, to serve as a guide for the grooved carrying-wheels, and thus keep the machine in a straight line. To the under side of the frame is attached a bar, the angular ends of which fit into the grooves of the guide-wheels, to keep the said grooves clear of soil, so that they will receive and travel upon the guide-cord. The guide-cord is laid at a uniform distance from its previous position by means of a spacing-bar having at one end a straight-edged cross-head, having staples and fastening-pins for securing it in place, as will be hereinafter fully described.

A is a long and narrow frame, to the center of which is journaled the middle part of a long cross-shaft, B, to which are secured as many wheels C as it is desired to mark rows at a time, and at a distance apart equal to the desired distance apart of the said rows. The faces of the wheels C have V-shaped grooves formed in them to form small ridges in the soil, and to the said wheels, in the bottoms of the said grooves, are secured lance-shaped blades or points D, to form holes in the soil to receive the seed or plants, the shape of the said blades causing them to enter and leave the soil easily.

To the rear end of the frame A are attached handles E to be grasped by the person pushing the machine; and to the forward end of the frame A is hinged a frame, F, to be grasped by the person drawing the machine. The forward part of the frame F is so formed that the person drawing the machine can enter it and rest his breast against the forward cross-bar of the said frame, which cross-bar is rounded upon its rear side, so that it will rest easily against the breast of the operator.

To the side bars of the frame F, at a little distance from its forward end, is attached a cross-rod, F', the ends of which project, so that the operator can pass his arms around them, and thus apply his strength conveniently to the said frame. The operator can grasp the frame F with his hands, if desired.

In slots in the frame A, in front and rear of its center, are placed wheels G, the journals of which revolve in bearings in the said frame. The faces of the wheels G are grooved to receive the cord H, so that the operator can readily keep the machine in a straight line.

The cord H is stretched across the field, and is kept in place by staples I, placed over it and pressed into the soil, so that the wheels G will pass over them easily.

To the under side of the frame A is attached a bar, R, the ends of which are made angular to fit into the grooves of the guide-wheels G and scrape out any soil that may be packed into the said grooves, and thus keep the said grooves clear to receive and travel upon the cord H.

J is a bar, which is made of a length equal to the distance apart at which the cords H are to be laid. To one end of the bar J is attached a cross-head, K, which is made with a straight edge, so that the bar J can be readily laid at right angles to the line of the cord H.

To the straight edge of the cross-head K are attached two staples, L, to receive pins M, which are to be inserted in the mark made by the cord H, to keep the bar J in place while securing the cord H in its new position at the other end of the said bar J.

To the cross-head K is attached a long staple, N, to receive the staples I, for convenience in carrying the said staples.

The cord H, when not in use, is wound upon a spool, O, which turns upon a rod, P, and is provided at one end with a crank-pin or handle, Q, for convenience in turning it to wind up the said cord H.

In using the marker the cord H is stretched across the field and secured in place at such a distance from the side of the said field as to be in proper position to receive the wheels G when the outer wheel, C, is at the side of the field, and the machine is drawn across the field with its wheels G upon the said cord. The cord H is then raised from the ground and the cross-head K of the bar J is arranged in line with the mark made by the said cord. The cord H is then secured to the ground at the other end of the bar J, and the bar is taken up, carried forward a suitable distance, and again arranged with its cross-head K in line with the mark of the cord, and the cord is brought to its other end and secured to the ground, and so on until the cord has again been stretched across the field parallel with and at the proper distance from its former position. The marker is then drawn along the cord, making another series of marks, and so on until the whole field, or the desired part of the said field, has been marked, ready to receive the seed or plants.

Having thus described my invention, I claim as new and desire to secure by Letters Patent—

1. A land-marker constructed substantially as herein shown and described, and consisting of the frame carried upon two grooved guide-wheels, provided with a hinged draw-frame, and carrying a shaft provided with a series of grooved wheels having radial marking-blades, as set forth.

2. In a land-marker, the combination, with the frame A, of the two grooved wheels G, placed in line with each other and with the length of the frame, substantially as herein shown and described, whereby the machine can be readily drawn along a guide-line, as set forth.

3. The draft-frame F, having breast-bar in front, and behind it a cross-bar, F', extending beyond each side bar, whereby a man can bear with his breast against the front bar and pass his arms around the ends of the cross-bar, as and for the purpose specified.

4. In a land-marker, the combination, with the frame A, provided with grooved guide-wheels G, of the shaft B, provided with a series of grooved marking-wheels, C, having radial blades D, substantially as herein shown and described, whereby a number of rows of seed or plant receiving marks will be formed at each passage of the machine across the field, as set forth.

5. In a land-marker, the combination, with the guide-wheels G, journaled to the frame A, of the guide-cord H, secured in place by staples I, substantially as herein shown and described, whereby the machine will be kept in a straight line as it is drawn across the field, as set forth.

6. In a land-marker, the combination, with the frame A and the grooved guide-wheels G, of the bar R, made angular at both ends, substantially as herein shown and described, whereby the grooves of the said wheels are kept clear of soil, as set forth.

7. In a land-marker, the spacing-bar J, provided at one end with a straight-edged cross-head, K, having staples L and fastening-pins M, whereby the guide-cord can be readily laid at a uniform distance from its previous position, as set forth.

JAMES J. MELVILLE.

Witnesses:
JAMES T. GRAHAM,
C. SEDGWICK.